F. H. Smith.
Fruit Dryer.
No. 3,017. Reissued Jun. 30, 1868.
Fig. 1.
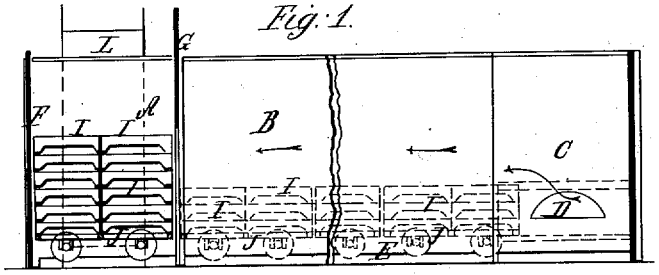
Fig. 3.
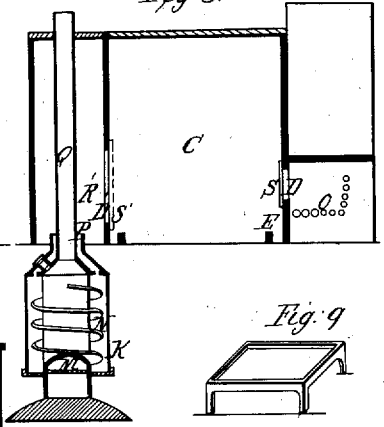
Fig. 2.
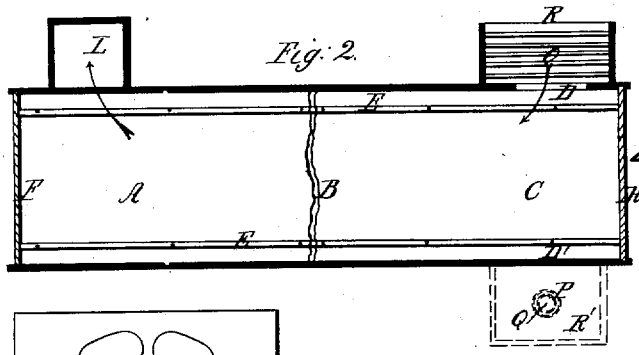
Fig. 9
Fig. 5.
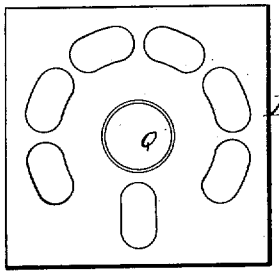
Fig. 4.
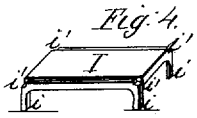
Fig. 6.
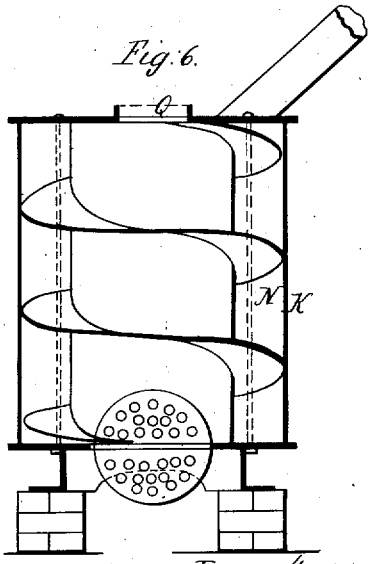
Fig. 8.
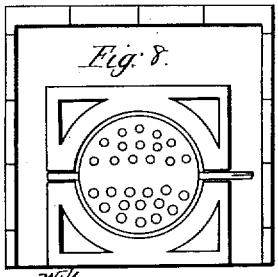
Fig. 7.
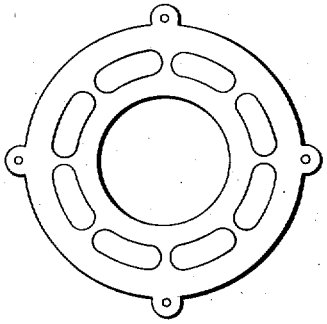
Witnesses;
John D. Bloor
Edwin James
Inventor;
Francis H. Smith
Per Holmead & Hollingshead

UNITED STATES PATENT OFFICE.

FRANCIS H. SMITH, OF BALTIMORE, MARYLAND.

IMPROVEMENT IN DRIERS.

Specification forming part of Letters Patent No. 562, dated February 26, 1861; Reissue No. 3,017, dated June 30, 1868.

*To all whom it may concern:*

Be it known that I, FRANCIS H. SMITH, of the city of Baltimore, county of Baltimore, and State of Maryland, have invented a useful Improvement in Drying-Tunnels; and I do hereby declare that the following is a full, clear, and exact description of the same, reference being had to the accompanying drawings, forming a part of this specification, in which—

Figure 1 represents a longitudinal vertical, Fig. 2 a horizontal, and Fig. 3 a vertical cross-section, of my drying-tunnel. Fig. 4 is a perspective view of one of the trays, hereinafter described; Fig. 5, a top plate of furnace; Fig. 6, vertical section; Fig. 7, bottom plate; Fig. 8, plan of bottom box; and Fig. 9, same as Fig. 4, for fruit.

Similar letters of reference in each of the several figures indicate corresponding parts.

The nature of my invention consists in a tunnel having a furnace, or its equivalent, at the rear end, and a chimney at the front end, in combination with gates, cars, trays, and rails, constructed substantially as and for the purposes hereinafter described. The rails may either be arranged on a level plane or slightly inclined.

My invention also consists in arranging at one end of the tunnel an improved style of furnace.

Furnaces constructed with straight air-chambers are found by experience to be more or less objectionable, from the fact that the current of fresh air which is constantly being introduced rushes through the chamber and is discharged into the tunnel without being properly heated.

By my arrangement of air-chamber this difficulty is entirely obviated, and at the same time the free entrance and exit of the air are in no manner interfered with. I wind spirally around the furnace-column a metal sheet sufficiently wide to fill the entire chamber. This causes the air, when it enters the chamber, to traverse, as it were, through a spiral flue, by which means it is brought in contact with a much greater extent of heating-surface, and, owing to the form of the flue, the air is sufficiently retarded in its circuitous passage to insure of its being thoroughly heated.

The whole apparatus is intended for drying brick, fruit, &c., by means of cars loaded with trays, upon which the articles to be dried are piled, the cars traveling through a heated tunnel.

The apparatus is so arranged that the drying-tunnel and loading of the cars can go on uninterruptedly for any length of time.

To enable others skilled to make and use my invention, I will proceed to describe its construction and operation.

A B C represent a tunnel of considerable length—say, one hundred feet—made of brickwork, or other suitable material. The rear and front end of the tunnel are provided with gates H and F, which can be closed or opened, as may be necessary in the course of the operation.

The front portion A of the tunnel may be cut off from the main part of the tunnel by means of a gate, G, which is represented half-open in Fig. 1. The section A communicates with a chimney, L, while the rear end C of the tunnel communicates through an opening, D, with a furnace, R, provided with a suitable grate, O.

A railway is composed of rails E E, and is laid on the floor of the tunnel. The plane on which the rails are laid may be level, or, if preferred, slightly inclined from the front toward the rear of the tunnel.

A number of cars, enough to fill the whole length of the tunnel, are provided, and are to be loaded, one after the other, with trays I, upon which the articles to be dried are placed.

The said trays are constructed as clearly shown in Fig. 4, having each four legs, *i*, fitting in cavities *i'* in the upper corners of the tray below.

This construction is needful in order to enable the trays to stand securely in four separate stacks, as represented at I I, Fig. 1, with a space between their edges to facilitate handling.

When the tunnel is used for the purpose of drying fruits and vegetables, the style of tray used is shown in Fig. 9. Instead of the flat table-top a ledge, *i i*, is attached, which, for fruits, should be about two inches in height, and for vegetables, such as sweet potatoes, about four inches high. The first car having been freighted in this manner while in section A of the tunnel, the gate F is shut and gate G is opened, as seen in Fig. 1, and the car is pushed into the main part B of the tunnel, so that the gate G can be shut behind it. The gate F is then opened, the next car is entered into section A, and, after having been freighted in the same manner as the preceding car, the gate G is again opened and the car is moved forward into section B, pushing the first car forward. The gate G is then again shut, gate F is opened, and the third car is entered and freighted, and so forth, each car pushing forward the preceding series of cars as it enters the main part B of the tunnel until the car which had been entered first arrives at the end C of the tunnel. The gate H is then opened as often as a car is entered, in order to allow the last car of the series to pass out of the tunnel. The heated gases arising from the combustion of fuel in furnace R enter through opening D and pass through the whole length of the tunnel, and finally out at the chimney L.

From this it will be seen that the substances to be dried enter the tunnel at the end where the temperature is lowest, and are gradually subjected to an increasing heat as they approach the other end of the tunnel, where they finally come in contact with the intense heat arising directly from the furnace.

It is intended that about twenty-four hours shall elapse from the entrance to the exit of each particular car, thereby giving ample time for drying the articles with which the cars are freighted thoroughly while they pass through the entire length of the tunnel.

The rails E E may be level or slightly inclined, as shown in Fig. 1, so that the whole series of cars can be pushed along easily by the operator or operators attending the rear car.

The draft caused from the furnace R through the whole length of tunnel toward and out of the chimney L serves to carry the moisture of the drying articles away as fast as it is liberated; by which means the drying process is considerably facilitated.

Figs. 3 and 6 represent, at Q, R′, D′, S′, P, N, M, and K, a modification or substitute for the furnace R to suit the apparatus for drying fruit, vegetables, and similar articles. For this purpose the opening D, connecting the tunnel with the furnace R, is closed by means of a suitable valve or damper, S, and the valve or damper S is opened, so as to effect a communication between the rear part [illegible] the tunnel and a hot-air chamber, R′, through opening D′. The air in this chamber is heated by means of a suitable hot-air furnace, which consists of a drum, *k*, spiral hot-air passage N, central fire-place *m*, and smoke-stack Q. The hot-air passes from the drum through P into chamber R′, and thence through opening D′ into the tunnel, obeying the draft created by the chimney L at the front end, and thereby drying the articles upon the shelves and cars passing through the tunnel in the same manner as already set forth.

Figs. 5, 7, and 8 show modified forms of the furnace and air-chamber. The fresh air enters through openings *v* of plate V, and is discharged through openings *v′* of plate V′. The whole furnace is supported on brick-work W.

It will be understood that this apparatus in its original or in its modified form will answer for drying various articles, such as, for instance, bricks, tile, pottery, cores for castings, and other manufactures of clay and sand, grain, fruit, vegetables, lumber, glue, starch, whiting, sugar, bagasse, guano, leather, hides, fish, meat, saltpeter, alum, and other chemicals.

Having thus fully described my invention, what I claim therein as new, and desire to secure by Letters Patent, is—

1. The tunnel A B C, furnace R, and chimney L, when the former is so constructed and arranged that the current of warm air is supplied to the same at the opposite point from which the articles to be dried enter, which causes the article to be subjected to the action of a varying temperature, substantially as described, and for the purpose specified.

2. The tunnel A B C, furnace R, and chimney L, and gates F, G, and H, when the same are so combined and arranged as to operate substantially as described, and for the purpose specified.

3. The tunnel A B C, furnace R, chimney L, and gates F G H, when the same is in combination with the rails E E and car J, and the whole operates substantially as and for the purpose specified.

In testimony whereof I have signed my name to this specification before two subscribing witnesses.

FRS. H. SMITH.

Witnesses:
D. C. STRATTON,
WASH. A. DANSKIN.